UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF MAKING SULFURIC ANHYDRID.

1,204,142.  Specification of Letters Patent.  Patented Nov. 7, 1916.

No Drawing.  Application filed December 6, 1915.  Serial No. 65,285.

*To all whom it may concern:*

Be it known that I, CARLETON ELLIS, a citizen of the United States, and a resident of Montclair, in the county of Essex and State of New Jersey, have invented certain new and useful Improvements in Processes of Making Sulfuric Anhydrid, of which the following is a specification.

This invention relates to a method of making sulfuric acid or sulfuric anhydrid and commercial products such as oleum or fuming sulfuric acid in various strengths and relates particularly to a process of oxidizing sulfur dioxid by contact with catalytic agents comprising tin and chromium material.

When a mixture of sulfur dioxid and air is brought in contact with the heated contact material containing tin oxid and chromium oxid a most unexpected degree of conversion of the sulfur dioxid to sulfur trioxid occurs. Neither the chromium or tin body by itself effects any such conversion, under continued use. Jointly from 85 to about 96% of the sulfur dioxid is converted into sulfur trioxid but when used separately under similar conditions the tin oxid or chromium oxid material afford a much lower conversion.

A feature of the invention is the use of catalytic material in the form of a porous granular mass with or without extending material.

An illustrative example of the method of making the catalytic material employed in the present process is the following: 50 parts by weight of stannous chlorid containing two molecules of water and 56 parts of ammonium dichromate are dissolved in water and mixed. The material is evaporated to dryness and heated somewhat to drive off ammonium chlorid. This material is powdered and mixed with 20 parts of powdered oxalic acid. Water is added in sufficient quantity to make a paste. This material is dried at a comparatively low temperature and is then heated to decompose the oxalic acid and also to expel any residue of ammonium chlorid. The porous mass produced is screened to produce a material which will pass a sieve having six meshes per inch, and which will be retained by a twenty mesh sieve. The granular material preferably is placed in the catalyzer heating apparatus or conversion chamber and maintained at a temperature of 800–900° F. for about an hour before gases are passed through. A mixture of air and sulfur dioxid gas is passed through the contact material at a temperature of about 800–900° F. employing ordinarily about 5–12% of sulfur dioxid in the gas mixture, affording a conversion ranging from approximately 80 to 95 or 96%. The pressure of the gases may be greater or less than atmospheric.

The amount of tin material employed may be modified within wide limits. It is by no means necessary to employ equivalent or combining proportions. For example, to 56 parts of the dichromate from 5 to 75 parts of tin chlorid may be employed or even greater variations are possible. With very small percentages of tin the life of the catalyzer appears to be reduced. A good proportion is 25 parts hydrated stannous chlorid to 56 parts ammonium dichromate. The tin salt is dissolved in weak hydrochloric acid and then incorporated with the ammonium dichromate. The material is taken to dryness on a heated surface and is heated until no more fumes of ammonium chlorid are given off. During the drying operation the catalyzer swells to form a porous mass and then hardens to yield a light porous granular contact material of good physical structure.

Various other materials may be incorporated with the raw contact composition to aid in producing porosity; sugar, starch, dextrin and the like being useful and in fact a fairly porous product may be obtained by simply heating the wet mass on a hot plate so that the expansion of the steam generated may be used to produce a porous product. A contact material was prepared with the aid of sugar as follows: 50 parts of $SnCl_2.2H_2O$ were dissolved in water acidified with hydrochloric acid and thereupon treated with a solution of 50 parts ammonium dichromate in water. The product was evaporated to dryness and heated until no more fumes of ammonium chlorid were given off. The cake was then ground to a fine powder, mixed with 20 parts granulated cane sugar and the entire mixture ground until it passed a 40 mesh screen. The mass moistened with water and taken to dryness on a hot plate, afforded a light porous cake. This was broken up into granules passing a six mesh screen.

Binding agents such as waste sulfite liquor, gelatinous silicic acid, and other similar binders may be employed. The contact mass may be supported on fragments of material such as pumice or unglazed clay marbles and the like. The raw catalytic mass may be mixed with finely-divided material such as kieselguhr, clay and the like to extend the material to the desired extent and this formed into porous granules as above indicated. Likewise, such composition may be coated on a coarse granular or fragmental carrier as desired.

The gases from pyrites burners or from the burning of sulfur and so forth may be washed and duly purified to remove dust and other undesirable impurities and with the requisite quantity of air are passed through the catalytic material heated to the operative temperature (800–900°) F.). The gas mixture may be dried at any desired point and air admitted to pyrites or sulfur burners may be previously dried. The products issuing from the catalytic chamber are suitably absorbed in strong or weak acid or otherwise collected to afford sulfuric anhydrid or sulfuric acid in solution or in solid form. In making oleum it is desirable to start with acid of slightly over 100% in which the $SO_3$ is absorbed.

A further modification of the process involves the use of a two stage method in which conversion is allowed to take place in one catalytic (tin chromium) chamber to the desired extent, say, 50–75% conversion, the sulfur trioxid is removed and the residual gases are passed into a second catalytic chamber also containing the tin and chromium material when a second conversion occurs to afford 90 to 98% total transformation of sulfur dioxid to sulfur trioxid.

In lieu of using the tin chromium composition in the first catalytic chamber iron oxid such as that obtained from pyrites burners or any other suitable form of iron oxid may be charged into the first chamber where a conversion of about 50% is secured and the residual gases depleted of their sulfuric anhydrid are then passed through a tin chromium mass in the second catalytic chamber affording a conversion of 90 to 98%. The joint use of iron oxid and the tin-chromium composition enables the cheap and effective production of sulfur trioxid. Similarly other catalytic substances may be used in series with the tin chromium material.

When the catalyzer has become spent from long use it may be revivified by the passage of sulfur dioxid with only a relatively small amount of air through the mass so as to establish substantially reducing conditions for a time which tends to revivify the catalyzer. Finally, when the catalyzer has lost its activity to a marked degree and is not capable of being further revivified by such reducing treatment the material may be subjected to such chemical treatment as will reestablish its activity.

An over-reduced catalyzer can be exposed to heated air until a sufficient degree of oxidation has taken place.

I do not claim herein specifically, the use of a catalyst consisting essentially of a chromate of tin, such as subject matter being claimed in my copending application 103,566.

I do not herein claim broadly the use of a catalyst comprising an oxid of chromium and an oxid of another metal capable of absorbing $SO_2$, or capable of increasing the catalytic activity of the chromium oxid, nor do I claim the composition of the catalyzers herein described, such subject matter being claimed in my copending application 75,028.

What I claim is:—

1. The process of producing sulfuric anhydrid which comprises passing a mixture of sulfur dioxid and air into contact with catalytic material comprising an active basic compound of tin and voluminous free chromium oxid.

2. The process of producing sulfuric anhydrid which comprises passing a mixture of sulfur dioxid and air into contact with porous masses of catalytic material comprising an active basic compound of tin and voluminous free chromium oxid material.

3. The process of producing sulfuric anhydrid which comprises passing a mixture of sulfur dioxid and air into contact with catalytic material comprising tin oxid and voluminous active basic chromium material, the proportion of tin oxid being less than its combining equivalent with chromium to form tin chromate.

4. The process of producing sulfuric anhydrid which comprises passing a mixture of sulfur dioxid and air into contact with catalytic material comprising tin oxid and chromium oxid in non-equivalent proportions.

5. The process of producing sulfuric acid material which comprises subjecting sulfur dioxid in the presence of an oxidizing gas to the action of an oxidizing catalyst comprising tin oxid and chromium oxid of an active character; some portion at least of said stanniferous material being uncombined with said chromium material.

6. The process of producing sulfuric anhydrid which comprises passing sulfur dioxid and air into contact with a catalytic agent to effect partial conversion of sulfur dioxid to sulfur trioxid, in substantially completely removing the sulfur trioxid and in passing the residual gases into contact with a catalytic agent comprising an active basic compound of tin and voluminous active basic chromium material uncombined therewith.

7. A process of producing sulfuric anhydrid which comprises contacting a gas mixture comprising sulfur dioxid and oxygen, with a catalytic material comprising chromium oxid and tin oxid.

8. A process of producing sulfuric anhydrid which comprises contacting a gas mixture containing sulfur dioxid and oxygen with a catalytic body capable of partially converting the sulfur dioxid into sulfur trioxid, removing at least the major portion of the sulfur trioxid from the gases, and passing the remaining gases into contact with a catalytic agent comprising oxycompounds of tin and chromium.

CARLETON ELLIS.